United States Patent [19]
McGough

[11] Patent Number: 5,562,534
[45] Date of Patent: Oct. 8, 1996

[54] GAME HOIST AND SKINNING AID

[76] Inventor: Alvin H. McGough, 3132 E. Republican Rd., Cabot, Ark. 72023

[21] Appl. No.: 412,876

[22] Filed: Mar. 29, 1995

[51] Int. Cl.⁶ .................. A22B 5/00; A22B 5/16
[52] U.S. Cl. ........................... 452/187; 452/125
[58] Field of Search ................. 452/187, 125, 452/128, 185, 189

[56] References Cited

U.S. PATENT DOCUMENTS

| | | | |
|---|---|---|---|
| 3,209,395 | 10/1965 | Jones et al. | 17/21 |
| 3,854,168 | 12/1974 | Bradley | 452/189 |
| 3,871,084 | 3/1975 | Carrington et al. | 17/21 |
| 4,021,884 | 5/1977 | Saltykov et al. | 17/21 |
| 4,338,703 | 7/1982 | Tanner | 452/187 |
| 4,506,411 | 3/1985 | Ivy | 17/44.3 |
| 4,806,063 | 2/1989 | York | 414/462 |
| 5,049,110 | 9/1991 | Owens | 452/187 |
| 5,211,601 | 5/1993 | Cope | 452/187 |

FOREIGN PATENT DOCUMENTS

| 1614779 | 12/1990 | U.S.S.R. | 452/187 |
|---|---|---|---|

Primary Examiner—Willis Little
Attorney, Agent, or Firm—Ray F. Cox, Jr.

[57] ABSTRACT

A portable game hoist and skinning aid which includes a support frame for supporting a deer carcass in a hoisted position off the ground and which may be attached to a tree, post or other vertical object by straps, chains or other means. The device includes a hand operated winch having a cable which may be passed over an upper pulley attached to the support frame to raise the deer carcass into position. The cable may also be run through a lower pulley and then attached to the skin of the animal so that operation of the winch provides assistance in skinning the suspended animal carcass.

2 Claims, 2 Drawing Sheets

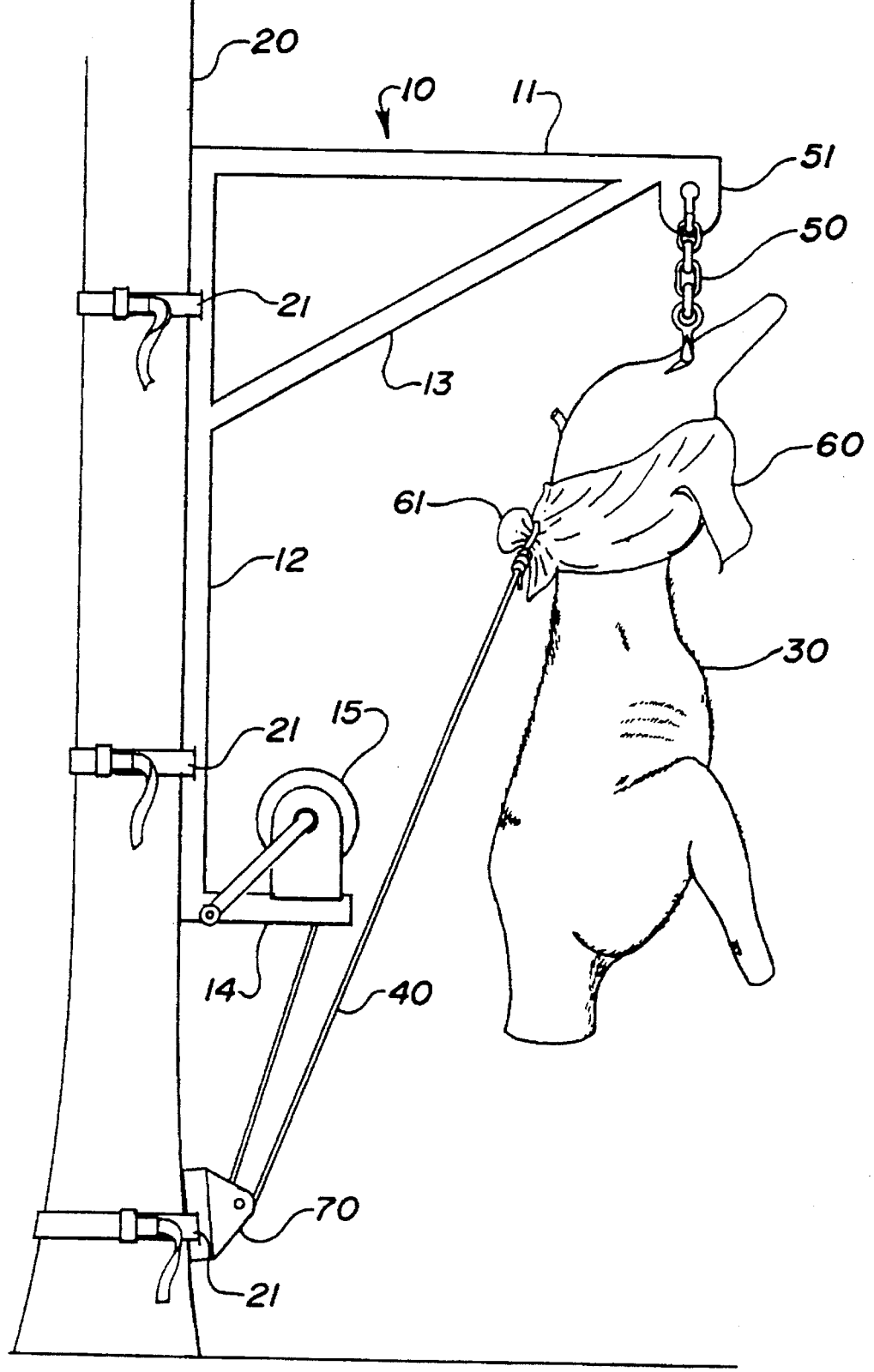

5,562,534

GAME HOIST AND SKINNING AID

BACKGROUND OF THE INVENTION

The present invention relates to wild game hoists and, in particular, to a wild game hoist which aids in the skinning and dressing process.

While the apparatus and method of the present invention has applicability to the skinning and dressing of various animal carcasses, it is particularly directed to the problems involved in skinning deer carcasses in the field. Typically in order to skin a deer carcass, the deer carcass must be hoisted off the ground. Since a deer carcass can be quite heavy, it is the normal practice to employ some form of mechanical hoisting means to raise the carcass from the ground. Various types of supports and hoists are known in the art. For example, U.S. Pat. No. 4,806,063 issued to York on Feb. 21, 1989 for "Portable Wild Game Hoist" discloses a portable wild game hoist having a multiple section boom which can be assembled and dismantled. The boom is supported by a standard trailer hitch on the rear of a vehicle.

A variant form of wild game support which suspends the animal carcass from a vertical support such as a post or tree is disclosed in U.S. Pat. No. 5,049,110 issued to Owens on Sep. 17, 1991.

Once the deer carcass has been suspended, skinning is normally performed manually by making certain incisions with a knife and gradually cutting and pulling the skin away from the carcass. This can be a tedious and time consuming process requiring a great deal of strength and manual dexterity. Various solutions have been proposed to simplify and reduce the physical labor involved in the skinning process. U.S. Pat. No. 4,506,411 issued to Ivy on Mar. 26, 1985 for "Game Skinning Apparatus" discloses a game skinning rack comprising a rectangular board with cam means mounted in notches for gripping the extremities of the animal being skinned. The Ivy device is specifically adapted to the skinning of a small game animal such as a squirrel.

By contrast, U.S. Pat. No. 3,871,084 issued to Carrington, et al. on Mar. 18, 1975 for "Deer Skinning Apparatus and Method of Using Same" is directed to the problem of skinning a large game animal such as a deer. Carrington discloses the use of a rope having a loop which is fastened around a flap of skin cut from the neck of the animal. The flap of skin is wrapped around an anchor block so that the loop of rope cannot slip off of the flap of skin. The opposite end of the rope is then attached to a vehicle and a force is applied to the rope in order to pull the skin from the animal.

Various types of mechanical apparatus for stripping the skin from an animal carcass are known from the commercial meat processing industry. Examples of these devices, which are not considered to be analogous to the problem faced by a hunter skinning an animal in the field, include U.S. Pat. Nos. 4,021,884 and 3,209,395. The latter patent is chiefly interesting in that it discloses an apparatus for mechanically pulling the hide downward from a suspended hog carcass.

U.S. Pat. No. 5,211,601 issued to Cope on May 18, 1993 for "Mechanical Deer Skinning Device" discloses a device for removing the skin from white tailed deer or other game animals. The device is self supporting and operates by holding the skin of the animal stationary while the carcass is lifted and pulled from the skin.

It is an object of the present invention to provide for a lightweight portable hoist for hoisting wild game carcasses while also providing means to assist in the skinning process. It is a further object of the present invention to provide for a portable game hoist and skinning aid which may be mounted to a tree, post or other substantial vertical object.

Still another object of the present invention is to provide for a portable game hoist having a winch apparatus for hoisting the animal carcass into position which may also be employed to provide mechanical advantage to assist in the skinning process.

SUMMARY OF THE INVENTION

These and other objects of the present invention are provided in a portable game hoist and skinning aid which includes a support frame for supporting a deer carcass in a hoisted position off the ground and which may be attached to a tree post or other vertical objects by straps, chains or other means. The present invention further includes a hand operated winch having a cable which may be passed over an upper pulley attached to the support frame so that manual operation of the winch may be used to raise the deer carcass into position. The present invention further includes a lower pulley attached to the tree post or other vertical object such that the cable from the winch may be passed around the lower pulley and then attached to the skin of the suspended animal. By manually operating the winch, the mechanical advantage supplied therefor provides assistance in pulling the skin downward from the suspended animal carcass.

Other objects and advantages of the present invention may be understood from the following detailed description of the preferred embodiments in conjunction with the appended drawings as described below.

BRIEF DESCRIPTION OF THE DRAWINGS

FIG. 6 is a side elevation showing a deer carcass suspended from a chain resting in the keyhole chain support and further showing the cable from the winch running around the lower pulley and from thence to an attachment point on the skin of the deer carcass for removal of the skin by the downward pull exerted by the cable as the winch is operated

DETAILED DESCRIPTION OF THE PREFERRED EMBODIMENTS

Figure 1:
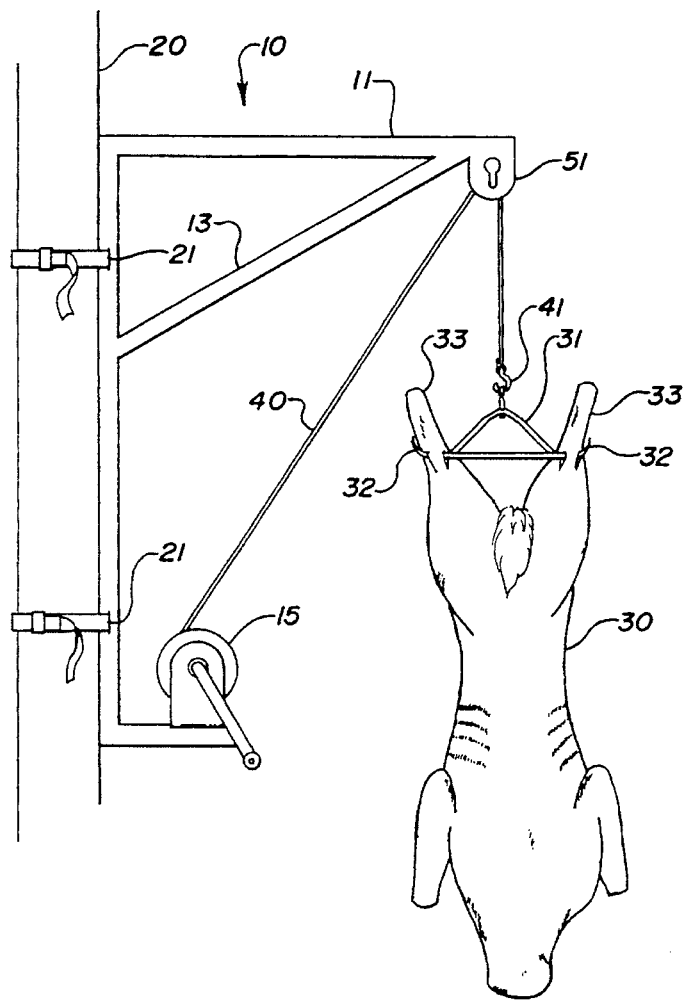
FIG. 1 is a side elevation of the support frame showing a deer carcass being hoisted by the winch.
Figure 2:
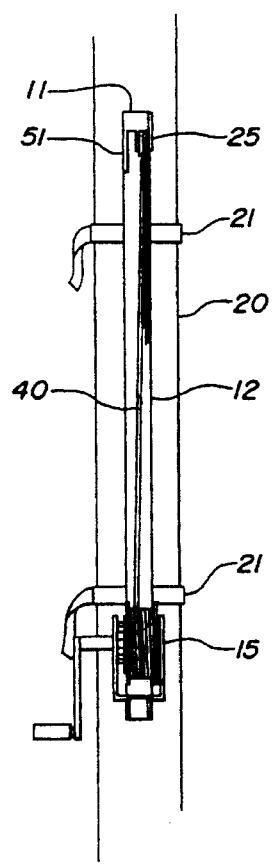
FIG. 2 is a front elevation of the support frame with the deer carcass and gambrel removed for clarity.
Figure 3:
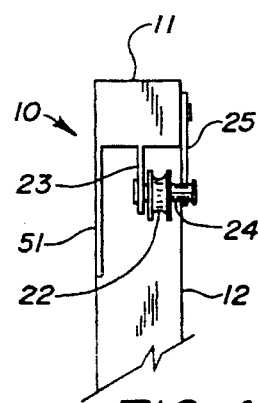
FIG. 3 is a left side elevation showing a detail of the keyhole chain support.

With reference to FIG. 6, a support frame 10 includes a horizontal support arm 11 which is rigidly affixed to a vertical backing member 12. A diagonal brace 13 is rigidly affixed to the horizontal support arm 11 and the vertical backing member 12 so as to provide extra strength and rigidity for the entire support frame 10. At the lower end of the vertical backing member 12, a winch support 14 is attached in an essentially horizontal orientation. The winch support 14 supports a winch 15 such that its axis of rotation is horizontal and orthogonal to both the horizontal support arm 11 and the vertical backing member 12. In the preferred embodiment, the winch 15 is manually operated, however, electrical or other winches operated by other than manual means would be acceptable.

The support frame 10 is designed to be compact, lightweight and field portable. The support frame 10 may be set up for operation by attaching it to a tree 20, vertical post or other substantial vertical object. It is desirable that the support frame 10 be attached to an object that is sufficiently strong and rigid to support both the weight of the support frame 10, the carcass of the animal being skinned and is furthermore strong enough to resist bending forces induced by the operation of the apparatus. It is also desirable that the support frame 10 be supported at a height above ground sufficient to allow the animal carcass 30 to be freely supported above the ground. The support frame 10 is oriented for operations such that the vertical backing member 12 is essentially vertical. The support frame 10 is attached to the tree 20 or similar object by means of straps 21. The straps 21 may be of various materials and construction. For example, nylon webbing materials having ratchet type locking mechanisms are commonly available and would be suitable for this application. In addition, metal chains looped about the tree 21 have been found to be suitable in practice.

Figures 4, 5:
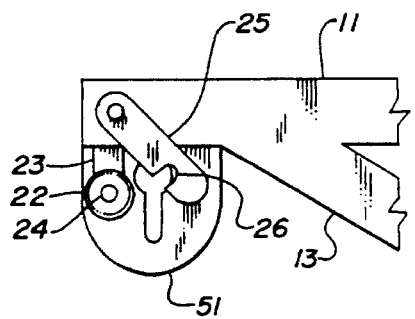
FIG. 4 is a partial front elevation showing a detail of the upper pulley.
FIG. 5 is a partial right elevation showing a detail of the keyhole chain support upper pulley and movable pulley guard.

With reference to FIG. 4, the support frame 10 is provided with an upper pulley 22. The upper pulley 22 is held in a bracket 23 suspended from the outer extremity of the horizontal support arm 11. The shaft 24 of the upper pulley 22 is suspended rotationally in the bracket 23 and in a movable pulley guard 25. The action of the movable pulley guard 25 is described with reference to FIGS. 4 and 5. The movable pulley guard 25 is pivotally attached to the horizontal support arm 11 by a pivot 26. The movable pulley guard 25 is provided with a slot 26 which engages the shaft 24 of the upper pulley 22. When the slot 26 is engaged, the upper pulley 22 is fully supported at each end of the shaft 24. However, as will be described more fully below, the movable pulley guard 25 may be rotated so that the slot 26 disengages from the shaft 24. In this position the upper pulley 22 is only supported by the support bracket 23. However, the upper pulley 22 is in this position able to receive a cable 40 from the winch 15.

The use of the present invention as a hoist for hoisting a carcass of a deer or other game animal from the ground is illustrated with reference to FIGS. 1, 4 and 5. The deer carcass 30 is suspended from a gambrel 31 by means of hooks 32 which pass through the tendons of the hind legs 33 of the carcass 30. A cable 40 is lead from the winch 15 over the upper pulley 22 with the movable pulley guard 25 disengaged from the shaft 24. The movable pulley guard 25 is then re-engaged with the shaft 24 of the upper pulley 22. The cable 40 terminates in a hook 41 which is attached to the gambrel 31. Operation of the winch 15 then acts to hoist the animal carcass 30 from the ground.

When the animal carcass 30 has been hoisted to a sufficient height above the ground, a short length of chain 50 as shown in FIG. 6 is employed to suspend the weight of the animal carcass 30 from the support frame 10. The chain 50 may be permanently attached to the gambrel 31 or may be hooked to the gambrel 31 in the manner described for the hook 41 of the cable 40. The chain 50 is suspended from the support frame 10 by means of a chain support 51 which vertically depends from the outer extremity of the horizontal support arm 11. The chain support 51 contains a keyhole slot 52. As is well known in the art, a chain 50 may be suspended by passing links of the chain 50 through a keyhole slot 52 after which the links of the chain 50 may be oriented so that the links of the chain 50 are locked into position in the keyhole slot 52.

After the chain 50 has been locked into the keyhole slot 52, the winch 15 may be operated in a reverse direction to slacken the cable 40 so that the chain 50 takes the full weight of the animal carcass 30. The hook 41 of the cable 40 may then be disengaged from the gambrel 31. The movable pulley guard 25 may then be disengaged from the upper pulley 22 so that the cable 40 may be removed from the upper pulley 22.

At this point the apparatus may be set up to assist in the removal of the skin 60 of the animal carcass 30 as shown in FIG. 6. A lower pulley 70 is fastened to the tree 20 at a position below the animal carcass 30 by means of straps 21. The cable 40 is lead from the winch 15 around the lower pulley 70 and thence to an upper portion of the animal carcass 30. The process of removing the skin 60 from the animal carcass 30 is begun manually by making incisions in the animal carcass 30 to produce a flap of skin 61 to which the cable 40 may be attached. Various means of attachment of the cable 40 to the flap of skin 61 as are well known in the art would be acceptable in the practice of the present invention.

After attachment of the cable 40 to the flap of skin 61, the winch 15 is operated so as to exert a downward pull on the skin 60 of the animal carcass 30. While maintaining the downward force on the skin 60, the operator may make such incisions and cuts as are necessary to assist in the removal of the skin 60 from the animal carcass 30.

The present invention is described with reference to certain preferred and alternative embodiments which are intended to be exemplary only and not by way of limitation to the full scope of the invention as set forth in the appended claims.

What is claimed is:

1. An apparatus for interchanging hoisting and skinning a game animal comprising:

gambrel means adapted to support the animal by its hind legs;

an upper pulley;

means to support said upper pulley at a height greater than the length of the animal when suspended by the hind legs;

a lower pulley;

means to fix said lower pulley at a low position below the animal when suspended by the hind legs;

a winch;

means to fix said winch at an intermediate position between said upper pulley and said lower pulley;

a cable running from said winch and capable of being extended through either said lower pulley when the animal is being skinned or said upper pulley when the animal is being hoisted;

means for attaching said cable to said gambrel means;

means for attaching said cable to selected portions of the skin of the animal;

chain support means attached to said means to support said upper pulley adjacent to said upper pulley; and a chain attached to said gambrel means and having means for attachment to said chain support means for alternatively supporting the animal while the animal is being skinned.

2. A method for skinning a game animal, comprising the steps of:

(a) supporting an upper pulley and chain support means at a height greater than the length of the animal when suspended by its hind legs;

(b) affixing a lower pulley at a low position below the animal when suspended by its hind legs;

(c) affixing a winch at an intermediate position between said upper pulley and said lower pulley;

(d) running a cable from said winch over said upper pulley;

(e) supporting the animal by its hind legs from a gambrel having an attached chain;

(f) attaching said cable to said gambrel;

(g) operating said winch to lift the animal from the ground;

(h) attaching said chain from said gambrel to said chain support means;

(i) operating said winch to allow said chain to receive the weight of the animal;

(j) detaching said cable from said gambrel;

(k) removing said cable from said upper pulley and running said cable around said lower pulley;

(l) cutting a selected portion of the skin of the animal and attaching said cable to said selected portion of the skin; and (m) operating said winch to remove the skin from the animal.

* * * * *